(12) United States Patent
Wagoner et al.

(10) Patent No.: US 9,503,007 B2
(45) Date of Patent: Nov. 22, 2016

(54) SYSTEM AND METHOD FOR CONTROLLING A POWER GENERATION SYSTEM CONNECTED TO A WEAK GRID

(71) Applicant: General Electric Company, Schenectady, NY (US)

(72) Inventors: Robert Gregory Wagoner, Roanoke, VA (US); David Smith, Daleville, VA (US); Yong Xu, Shanghai (CN)

(73) Assignee: General Electric Company, Schenectady, NY (US)

( * ) Notice: Subject to any disclaimer, the term of this patent is extended or adjusted under 35 U.S.C. 154(b) by 60 days.

(21) Appl. No.: 14/663,490

(22) Filed: Mar. 20, 2015

(65) Prior Publication Data

US 2015/0349688 A1    Dec. 3, 2015

(30) Foreign Application Priority Data

May 30, 2014  (CN) .......................... 2014 1 0236971

(51) Int. Cl.
| | |
|---|---|
| F03D 9/00 | (2016.01) |
| H02P 9/04 | (2006.01) |
| H02P 9/00 | (2006.01) |
| H02P 9/30 | (2006.01) |
| H02M 5/45 | (2006.01) |
| H02M 5/458 | (2006.01) |

(52) U.S. Cl.
CPC .............. *H02P 9/007* (2013.01); *F03D 9/003* (2013.01); *H02P 9/00* (2013.01); *H02P 9/305* (2013.01); *H02P 23/26* (2016.02); *Y02E 10/725* (2013.01)

(58) Field of Classification Search
USPC ........ 290/44, 55; 363/37, 90–99; 318/10–19
See application file for complete search history.

(56) References Cited

U.S. PATENT DOCUMENTS

| | | | | |
|---|---|---|---|---|
| 4,692,671 A * | 9/1987 | Dishner | .................... | F02C 7/32 290/4 C |
| 4,695,776 A * | 9/1987 | Dishner | .................... | F02C 7/32 290/4 C |
| 4,734,626 A * | 3/1988 | Sutrina | ............... | B60L 15/2054 290/4 R |
| 6,670,721 B2 * | 12/2003 | Lof | ......................... | F03D 9/003 290/2 |
| 7,203,078 B2 * | 4/2007 | Datta | .................... | H02M 7/219 363/37 |
| 7,405,553 B1 * | 7/2008 | Kattoju | ..................... | H02J 9/06 324/764.01 |
| 7,504,738 B2 * | 3/2009 | Barton | .................. | F03D 7/0284 290/40 R |
| 7,586,206 B2 * | 9/2009 | Barton | .................. | F03D 7/0284 290/43 |
| 7,830,127 B2 * | 11/2010 | Corcelles Pereira | . | H02J 3/1807 322/24 |
| 8,860,236 B2 * | 10/2014 | Nasiri | ................... | F03D 7/0272 290/44 |

(Continued)

OTHER PUBLICATIONS http://www.abb.us/product/seitp322/8cb6b0fde98c9ca6c1256dfa002bcda9.aspx?tabKey=7, dated Apr. 9, 2015 (Four Pages).

*Primary Examiner* — Pedro J Cuevas
(74) *Attorney, Agent, or Firm* — Dority & Manning, P.A.

(57) ABSTRACT

A method for controlling a power generation system connected to a weak grid may generally include operating a power converter of the system so as to produce current at or above a power factor threshold associated with a power factor operating requirement for the system, detecting that a generator speed of the system has increased over a period of time, detecting that a local reference voltage for the system has decreased within the same period of time over which the generator speed has increased and adjusting the operation of the power converter to produce current at a reduced power factor below the power factor threshold so as to increase a real power output of the system.

20 Claims, 5 Drawing Sheets

(56) References Cited

U.S. PATENT DOCUMENTS

| | | | |
|---|---|---|---|
| 8,964,435 B2* | 2/2015 | Wagoner | H02J 3/383 363/131 |
| 9,083,261 B2* | 7/2015 | Yang | H02M 7/487 |
| 9,136,709 B2* | 9/2015 | Wagoner | H02J 3/383 |
| 2004/0084965 A1* | 5/2004 | Welches | H02J 3/01 307/64 |
| 2005/0286279 A1* | 12/2005 | Datta | H02M 7/219 363/89 |
| 2007/0069522 A1* | 3/2007 | Barton | F03D 7/0284 290/44 |
| 2008/0150285 A1* | 6/2008 | Corcelles Pereira | H02J 3/1807 290/44 |
| 2009/0108583 A1* | 4/2009 | Barton | F03D 7/0284 290/44 |
| 2011/0018270 A1* | 1/2011 | Corcelles Pereira | H02J 3/1807 290/44 |
| 2011/0089693 A1* | 4/2011 | Nasiri | F03D 7/0272 290/44 |
| 2013/0030587 A1* | 1/2013 | El-Barbari | H02J 3/383 700/292 |
| 2013/0077372 A1* | 3/2013 | Wagoner | H02J 3/383 363/131 |
| 2013/0107594 A1* | 5/2013 | Wagoner | H02J 3/383 363/97 |
| 2013/0128632 A1* | 5/2013 | Yang | H02M 7/487 363/37 |
| 2013/0258732 A1* | 10/2013 | Zhu | H02S 50/10 363/95 |
| 2013/0300194 A1* | 11/2013 | Palmer | H02J 3/32 307/23 |

* cited by examiner

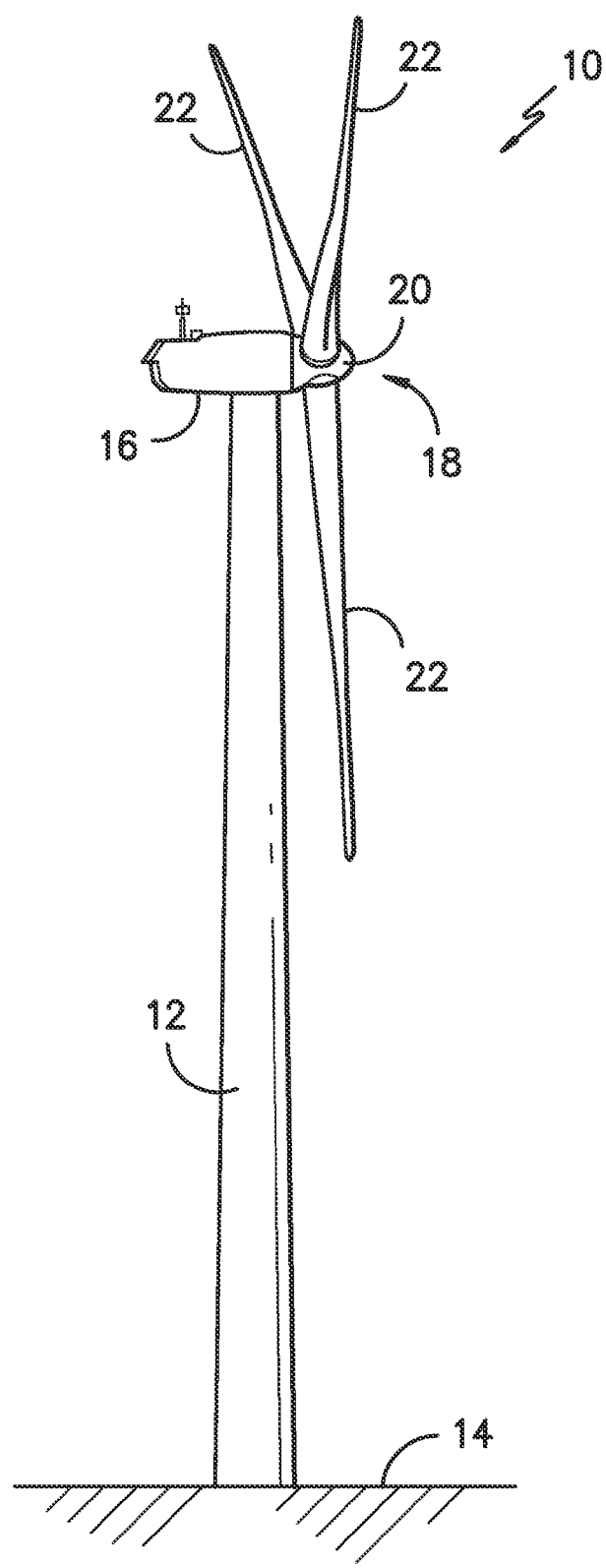
FIG. -1-

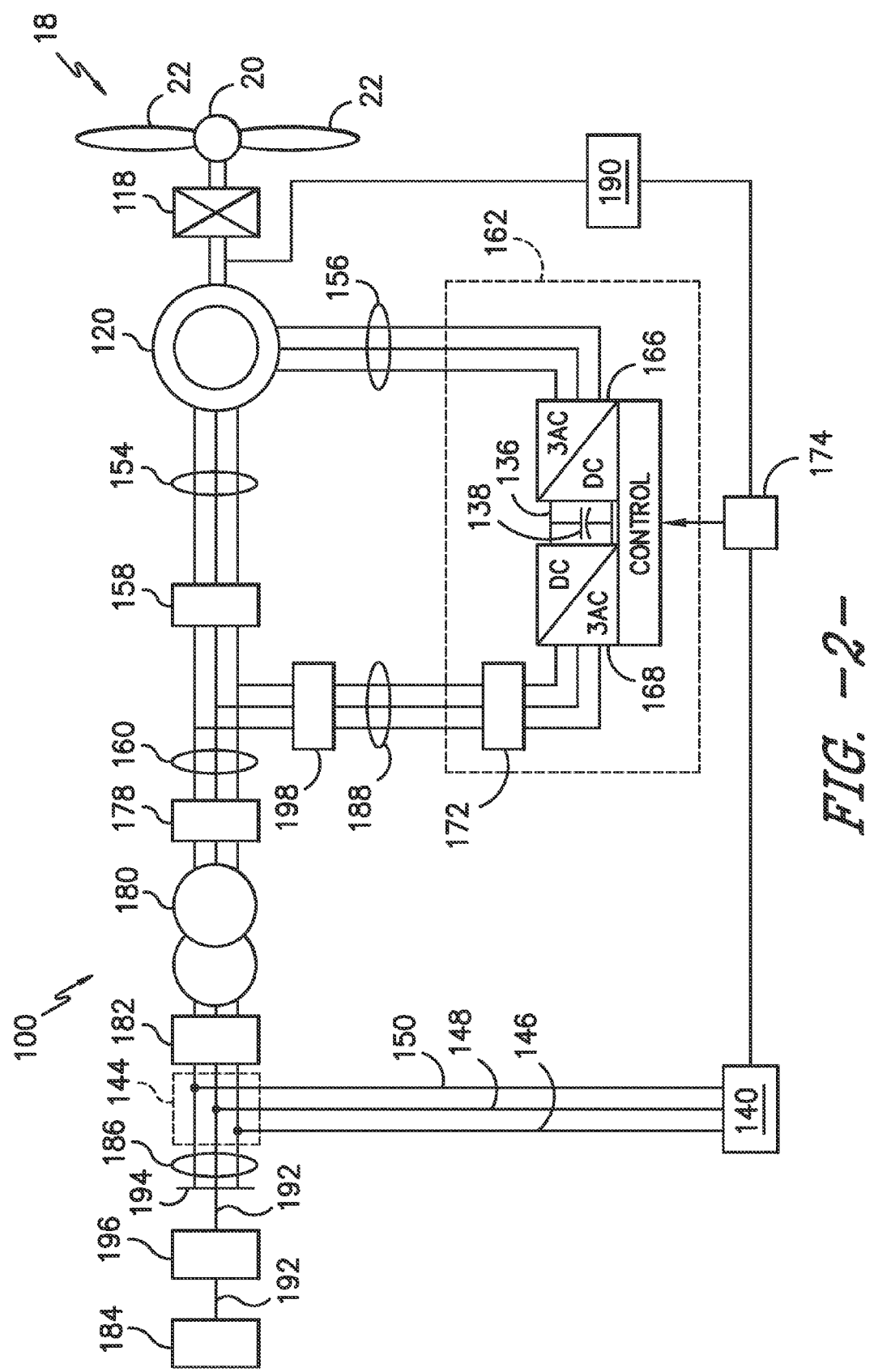
FIG. -2-

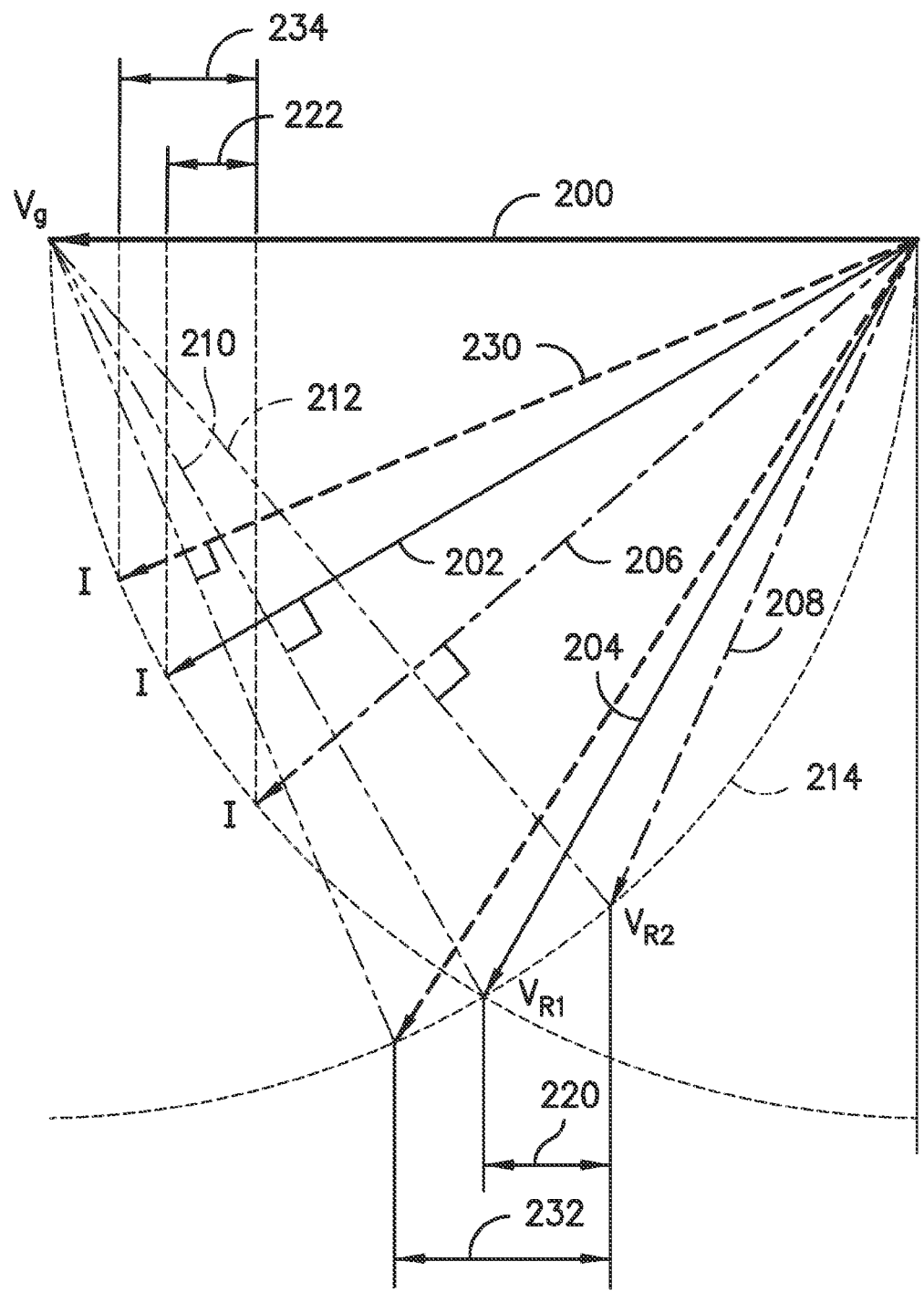
FIG. -3-

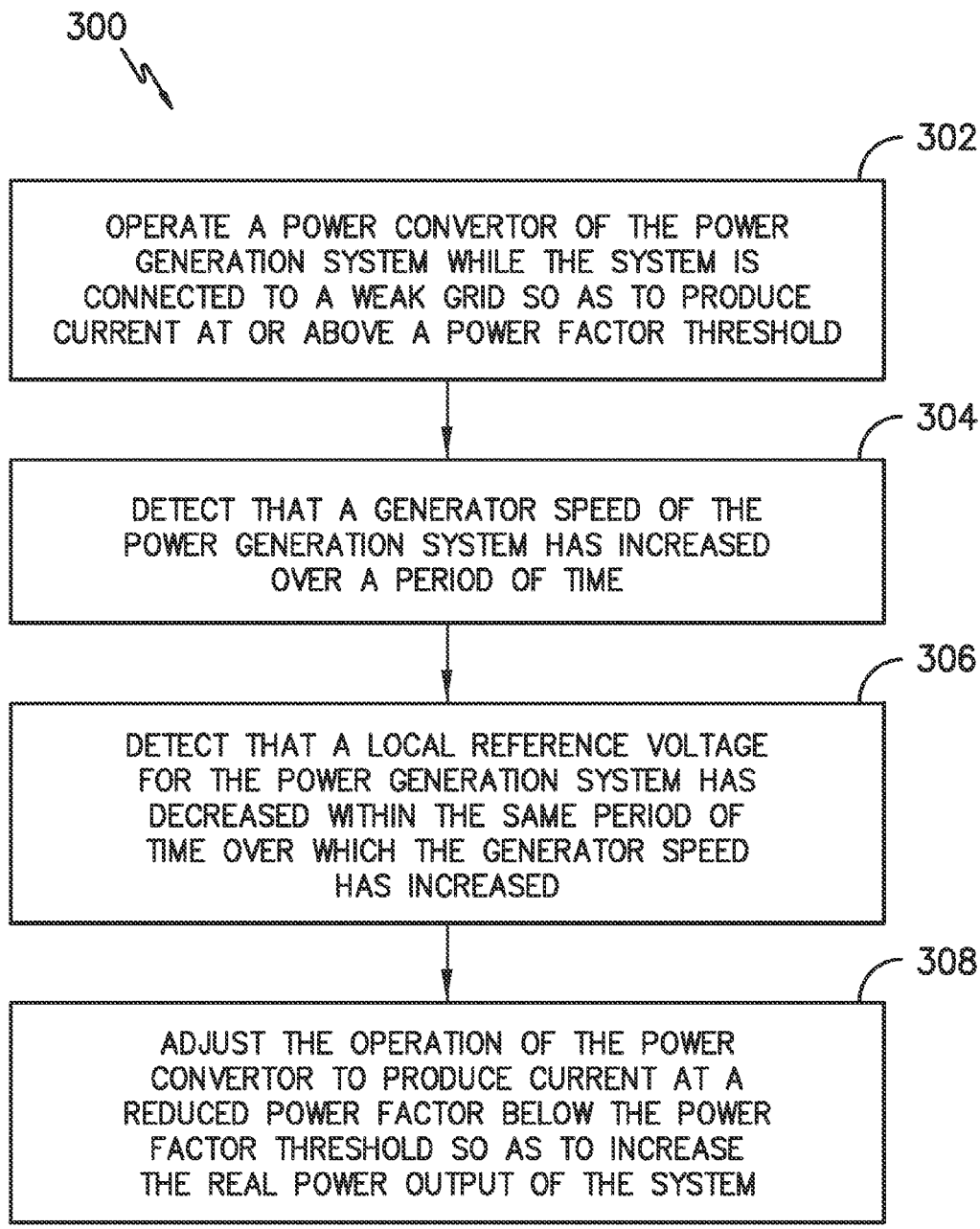
FIG. -4-

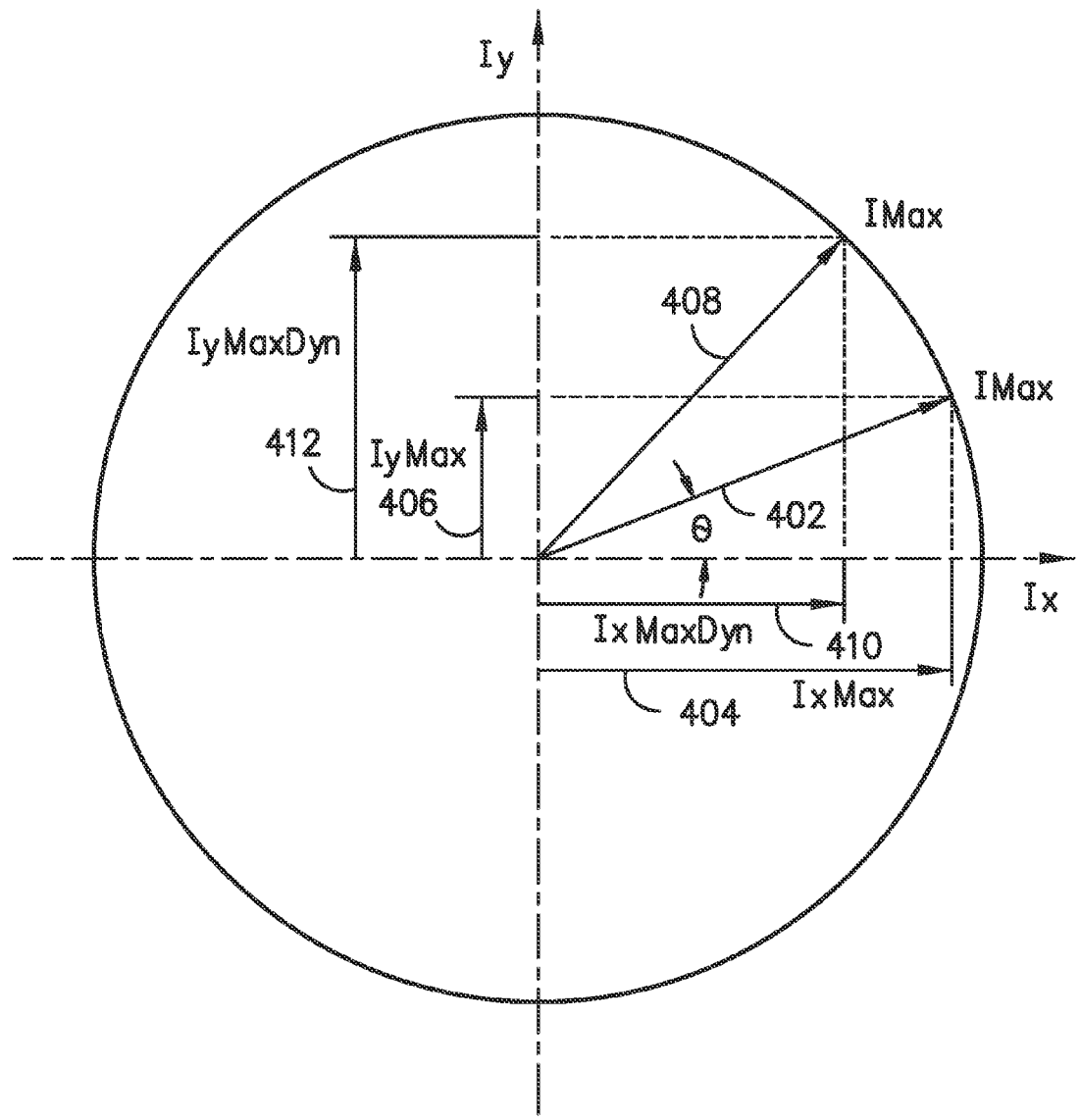
FIG. -5-

SYSTEM AND METHOD FOR CONTROLLING A POWER GENERATION SYSTEM CONNECTED TO A WEAK GRID

FIELD OF THE INVENTION

The present subject matter relates generally to power generation systems and, more particularly, to a system and method for controlling a power generation system connected to a weak grid when such system is subject to a power factor operating requirement that results in reduced power output at increased generator speeds.

BACKGROUND OF THE INVENTION

Power generation systems often include a power converter that is configured to convert an input power into a suitable power for application to a load, such as a generator, motor, electrical grid, or other suitable load. For instance, a power generation system, such as a wind turbine system, may include a power converter for converting variable frequency alternating current power generated at the generator into alternating current power at a grid frequency (e.g. 50 Hz or 60 Hz) for application to a utility grid. An exemplary power generation system may generate AC power using a wind-driven doubly fed induction generator (DFIG). A power converter can regulate the flow of electrical power between the DFIG and the grid.

In many instances, power generation systems may be located in remote areas far from the loads they serve. This is particularly true for renewable energy sources, such as wind turbine systems, solar/photovoltaic systems, hydroelectric systems and/or the like. Typically, such power generation systems are connected to the electrical grid through an electrical system including long transmission lines connected to the grid using one or more breakers. As a result, from the standpoint of the power generation system, the electrical grid is relatively weak due to the substantially high impedance of the electrical system.

During operation of a wind turbine system, the generator has a tendency to speed up during the occurrence of a transient event (e.g., a wind gust). As the generator speed increases, the output current of the wind turbine must also be increased in order to maintain a constant torque. In addition, as the output current increases, the converter controller typically attempts to maintain the resulting output power factor of the wind turbine system within the limits defined by the power factor operating requirement associated with the system. For instance, a wind turbine system may be required to operate such that it maintains an output power factor at or near unity power factor, such as a power factor ranging between 0.9 and 1.0. For a wind turbine system connected to a weak grid, as the wind turbine produces current at a power factor that is determined by the converter controller to be at or near unity power factor, the operating constraints resulting from the power factor operating requirement may actually cause in a reduction of the real power delivered to the grid. This results from the fact that the high grid impedance of the weak grid causes the local grid or reference voltage for the system to drop as the current is applied at or near unity power factor, at least from the reference frame of the converter controller. Such a condition may, in turn, lead to a runway overspeed of the generator, which can damage the generator and/or other components of the system.

Accordingly, a system and method for controlling a power generation system connected to a weak grid when such system is subject to a power factor operating requirement that results in reduced power output at increased generator speeds would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling a power generation system connected to a weak grid, wherein the system is subject to a power factor operating requirement. The method may generally include operating a power converter of the system so as to produce current at or above a power factor threshold associated with the power factor operating requirement, detecting that a generator speed of the system has increased over a period of time, detecting that a local reference voltage for the system has decreased within the same period of time over which the generator speed has increased and adjusting the operation of the power converter to produce current at a reduced power factor below the power factor threshold so as to increase a real power output of the system.

In another aspect, the present subject matter is directed to a system for controlling a power generation system connected to a weak grid, wherein the power generation system is subject to a power factor operating requirement. The system may generally include a power converter connected to the weak grid. The power converter may be configured to initially produce current at or above a power factor threshold associated with the power factor operating requirement. In addition, the system may include a controller communicatively coupled to the power converter. The controller may be configured to detect that a generator speed of the power generation system has increased over a period of time, detect that a local reference voltage for the power generation system has decreased within the same period of time over which the generator speed has increased and adjust the operation of the power converter to produce current at a reduced power factor below the power factor threshold so as to increase an real power output of the power generation system.

In a further aspect, the present subject matter is directed to a system for controlling a wind turbine system connected to a weak grid, wherein the wind turbine system is subject to a power factor operating requirement. The system may generally include a wind-driven generator and a power converter connected to both the wind-driven generator and the weak grid. The power converter may be configured to initially produce current at or above a power factor threshold associated with the power factor operating requirement. In addition, the system may include a controller communicatively coupled to the power converter. The controller may be configured to detect that a speed of the wind-driven generator has increased over a period of time, detect that a local reference voltage for the wind turbine system has decreased within the same period of time over which the speed of the wind-driven generator has increased and adjust the operation of the power converter to produce current at a reduced power factor below the power factor threshold so as to increase an real power output of the wind turbine system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine;

FIG. 2 illustrates a schematic diagram of one embodiment of a wind turbine system in accordance with aspects of the present subject matter;

FIG. 3 illustrates an example graphical view of how the local reference voltage for the wind turbine system is impacted when the system is connected to a weak grid and is attempting to produce current at a power factor at or near unity power factor;

FIG. 4 illustrates a flow diagram of one embodiment of a method for controlling a power generation system connected to a weak grid in accordance with aspects of the present subject matter; and FIG. 5 illustrates a graphical view of nominal real and reactive current limits for the power converter as well as examples of dynamic real and reactive current limits that may be implemented in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for controlling a power generation system connected to a weak grid when such system is subject to a power factor operating restriction. Specifically, power generation systems are often required to operate at power factors at or near unity power factor, such as a power factor ranging from 0.9 to 1.0. As indicated above, for a power generation system connected to a weak grid, the operating constraints provided by such power factor requirements may actually result in a reduction of the real power delivered to the grid during the occurrence of a transient event that increases the generator speed. In particular, as the current is applied at or near unity power factor, the local terminal or reference voltage for such a system begins to decrease, thereby leading to an overall reduction in the power output delivered to the grid.

As will be described below, the disclosed system and method provide a means for increasing the power output of a power generation system connected to a weak grid in response to increasing generator speeds. Specifically, in several embodiments, when decreasing local reference voltages are detected, the power factor operating requirements typically applied within the system may be disregarded, thereby allowing the power factor to be reduced below a minimum power factor threshold associated with the operating requirements. Given the operating conditions for the power generation system, such a reduction in the power factor may actually provide for an increase in the local reference voltage, thereby allowing for the real power delivered to the grid to be much higher than what could have been achieved by maintaining the power factor at or above the power factor threshold.

It should be appreciated that, as used herein, the term "weak grid" generally refers to an electrical grid that has a relatively high impedance as compared to its power generating source. For example, in several embodiments, a weak grid may be defined as an electrical grid that has a short circuit ratio of less than about 10, such as less than about 7 or less than about 5 or less than about 3 and any other subranges therebetween. In a particular embodiment, the disclosed system and method may be particularly advantageous for use with weak grids having a short circuit ratio of less than about 2, such as less than about 1.5 or less than about 1 and any other subranges therebetween. As is generally understood, the short circuit ratio corresponds to the ratio of the short circuit current of the electrical grid (i.e., the grid voltage over the grid impedance) over the rated current output for the power generation system supplying power to the grid. Thus, as the grid impedance increases (e.g., due to the use of longer transmission lines), the short circuit current correspondingly decreases, thereby resulting in a lower short circuit ratio (i.e., a weaker grid). The short circuit ratio and the short circuit current can be expressed, for example, using the following equations (Equations (1) and (2):

$$SCR = \frac{SCC}{I_{rated}} \quad (1)$$

$$SCC = \frac{V_g}{Z_g} \quad (2)$$

wherein, SCR corresponds to the short circuit ratio, SCC corresponds to the short circuit current, $I_{rated}$ corresponds to the rated output current of the power generation system, $V_g$ corresponds to the voltage at the "infinite source" at the end of the utility grid and $Z_g$ corresponds to the impedance of the transmission line(s) between the point of the short circuit and the "infinite source" end of the utility grid.

Additionally, the term "power factor" is generally used herein in connection with its ordinary and customary meaning. For example, the power factor may be equal to the cosine of a corresponding power factor angle, with the power factor angle being generally defined as a geometric relationship between the reactive power and the active power for the system. Specifically, the power factor and the power factor angle may generally be expressed according to the following equations (Equations (3) and (4)):

$$PF = \cos\varphi \quad (3)$$

$$\varphi = \tan^{-1}\frac{Q}{P} \quad (4)$$

wherein, PF corresponds to the power factor, $\varphi$ corresponds to the power factor angle, Q corresponds to the reactive power of the system (in VARS) and P corresponds to the active power of the system (in watts).

It should also be appreciated that, although the present subject matter will generally be described herein with respect to a doubly fed induction generator (DFIG) wind turbine system, the disclosed system and method may generally be utilized with any suitable wind turbine system, such as a full power conversion system. In addition, it should be appreciated by those of ordinary skill in the art that the disclosure provided herein may also be utilized with any other suitable power generation system that is connected to a weak grid.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, as will be described below, the rotor 18 may be rotatably coupled to an electric generator 120 (FIG. 2) to permit electrical energy to be produced.

Referring now to FIG. 2, a schematic diagram of one embodiment of a wind turbine system 100 is illustrated in accordance with aspects of the present subject matter. As shown, the rotor 18 of the wind turbine 10 may, optionally, be coupled to a gear box 118, which is, in turn, coupled to a generator 120. In several embodiments, the generator 120 may be a doubly fed induction generator (DFIG). However, in other embodiments, the generator 120 may correspond to any other suitable type of generator.

The generator 120 may be coupled to a stator bus 154 and a power converter 162 via a rotor bus 156. The stator bus 154 may provide an output multiphase power (e.g. three-phase power) from a stator of the generator 120 and the rotor bus 156 may provide an output multiphase power (e.g. three-phase power) from a rotor of the generator 120. As shown in FIG. 2, the power converter 162 includes a rotor side converter 166 and a line side converter 168. The generator 120 may be coupled via the rotor bus 156 to the rotor side converter 166. Additionally, the rotor side converter 166 may be coupled to the line side converter 168 which may, in turn, be coupled to a line side bus 188.

In several embodiments, the rotor side converter 166 and the line side converter 168 may be configured for normal operating mode in a three-phase, pulse width modulation (PWM) arrangement using suitable switching elements, such as insulated gate bipolar transistors (IGBTs) or any other suitable switching elements. The rotor side converter 166 and the line side converter 168 may be coupled via a DC link 136 across which one or more DC link capacitors 138 may be arranged in any parallel and/or series combination.

In addition, the power converter 162 may be coupled to a controller 174 configured to control the operation of the rotor side converter 166 and the line side converter 168. In general, the controller 174 may correspond to any suitable computing device and/or combination of computing devices. For instance, in several embodiments, the controller 174 may include one or more processor(s) and associated memory device(s configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 174 to perform various functions including, but not limited to, the computer-implemented methods described herein.

In typical configurations, various line contactors and circuit breakers including, for example, a grid breaker 182 may also be included for isolating the various components as necessary for normal operation of the generator 120 during connection to and disconnection from the electrical grid 184. For example, a system circuit breaker 178 may couple the system bus 160 to a transformer 180, which may be coupled to a grid bus 186 via the grid breaker 182. In alternative embodiments, fuses may replace some or all of the circuit breakers.

Additionally, as shown in FIG. 2, one or more transmission lines 192 (only one shown for clarity) may be coupled to the grid bus 186 via grid coupling 194. In several embodiments, the transmission line(s) 192 may include one or more series compensation elements 196, such as one or more capacitors, to facilitate reducing the reactive power losses within the transmission line(s) 192.

In operation, alternating current power generated at the generator 120 by rotating the rotor 18 is provided via a dual path to the electrical grid 184. The dual paths are defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. As is generally understood, switching elements (e.g. IGBTs) used in the bridge circuits of the rotor side power converter 166 may be modulated to convert the AC power provided from the rotor bus 156 into DC power suitable for the DC link 136.

In addition, the line side converter 168 converts the DC power on the DC link 136 into AC output power suitable for the electrical grid 184. In particular, switching elements (e.g. IGBTs) used in bridge circuits of the line side power converter 168 can be modulated to convert the DC power on the DC link 136 into AC power on the line side bus 188. The AC power from the power converter 162 can be combined with the power from the stator of generator 120 to provide multi-phase power (e.g. three-phase power) having a frequency maintained substantially at the frequency of the electrical grid 184 (e.g. 50 Hz or 60 Hz). In addition, the power flow from the rotor 18 through the converters 166, 168 and to the grid 184 may be in other direction.

Additionally, various circuit breakers and switches, such as grid breaker 182, system breaker 178, stator sync switch 158, converter breaker 198, and line contactor 172 may be included in the system 100 to connect or disconnect corresponding buses, for example, when current flow is excessive and may damage components of the wind turbine system 100 or for other operational considerations. Additional protection components may also be included in the wind turbine system 100.

Moreover, the power converter 162 may receive control signals from, for instance, the controller 174. The control signals may be based, among other things, on sensed conditions or operating characteristics of the wind turbine system 100. Typically, the control signals provide for control of the operation of the power converter 162. For instance, as shown in FIG. 2, one or more speed sensors 190 may be communicatively coupled to the controller 174 for monitoring the rotor speed of the generator 120. Such rotor speed feedback may, for example, be used to control the conversion of the output power from the rotor bus 156 to maintain a proper and balanced multi-phase (e.g. three-phase) power supply. In particular, the sensed rotor speed may be used as a basis for adjusting the switching frequency of the switching elements. Moreover, feedback from other sensors may also be used by the controller 174 to control the power converter 162, including, for example, stator, rotor and/or grid bus voltages, voltages associated with the switching elements and current feedbacks. Using the various forms of feedback information, switching control signals (e.g. gating control commands for the switching elements), stator synchronizing control signals, circuit breaker signals and/or other suitable control commands/signals may be generated.

Additionally, in several embodiments, the controller 174 may also be configured to receive feedback from a phase-locked loop (PLL) regulator 140. As is generally understood, the PLL regulator 140 may include or correspond to a closed looped circuit configured to detect phase information regarding a reference voltage (e.g., a locally sensed terminal or point-of-common coupling (POCC) voltage) and generate a resulting phase angle signal 142 to be used by the controller 174 for controlling the operation of the power converter 172 in a manner that synchronizes the converter's output voltage to the reference voltage. Specifically, the phase angle signal 142 generated by the PLL regulator may be constantly adjusted to match, in phase, the frequency of the local reference voltage, thereby allowing the PLL regulator to "lock on" to the frequency of such reference voltage. It should be appreciated that, although the PLL regulator 140 is illustrated herein as being separate from the controller 174, the PLL regulator 140 may be integrated into and/or form part of the controller 174. Alternatively, the PLL regulator 140 may be implemented on a separate computing device that is communicatively coupled to the controller 174.

In several embodiments, the PLL regulator 140 may be coupled to one or more voltage transducers 144 for receiving reference voltage measurements. For instance, as shown in FIG. 2, the PLL regulator 140 is coupled to three different voltage transducers 144 (e.g., via electrical conduits 146, 148, 150), with each voltage transducer 144 being coupled to one of the three phases of the grid bus 186. As indicated above, due to the high impedance associated with a weak electrical grid, a significant voltage drop occurs between the remotely served load and the location of the wind turbine system 100. As a result, the locally sensed voltage measurements provided by the transducers 144 and transmitted to the PLL regulator 140 may generally correspond to the difference between the grid voltage at the remote load and the voltage drop resulting from the grid impedance.

Referring now to FIG. 3, a graphical view is provided illustrating one example of how the local reference voltage of the system 100 is impacted when the system 100 is connected to a weak grid and is attempting to produce current at a power factor determined by the controller 174 to be at or near unity power factor, such as a power factor ranging from 0.9 to 1.0. As shown, a grid voltage vector 200 is shown across the top of the graph that corresponds to the grid voltage, $V_g$, at the remotely served load. The graph also includes a first current vector 202 corresponding to a fixed current, I, at a first phase angle and a first reference voltage vector 204 corresponding to the locally sensed reference voltage, $V_{R1}$, associated with the first current vector 202. In addition, the graph includes a second current vector 206 corresponding to the fixed current, I, at a second phase angle and a second reference voltage vector 208 corresponding to the locally sensed reference voltage, $V_{R2}$, associated with the second current vector 206. As shown, due the grid's inductance, the voltage drop between the grid voltage, $V_g$, and each locally sensed reference voltage, $V_{R1}$ and $V_{R2}$, leads the corresponding current, I, by 90 degrees (as indicated by the phantom lines 210, 212 extending perpendicularly from each current vector 202, 26, respectively, between the endpoint of the grid voltage vector 200 and a reference voltage vector locus 214 for the system 100). It should be appreciated that the graph shown in FIG. 3 has been drawn for explanatory purposes assuming that the grid is modeled substantially as an inductor.

As shown in FIG. 3, it may be assumed, for example, that the wind turbine system 100 is initially producing the fixed current, I, at the first phase angle associated with the first current vector 202. As indicated above, conventional control methodologies typically require that the power converter 162 produce current at an output power factor at or near unity power factor, such as at or above a power factor threshold of 0.9. However, as the controller 174 attempts to push the current closer in phase to the reference voltage in order to maintain the power factor above the required power factor threshold, the net voltage vector (e.g., line 210) rotates back towards the origin, thereby reducing the local reference voltage of the system 100. For example, as shown in FIG. 3, by adjusting the phase angle of the current, I, to the second phase angle associated with the second current vector 206 in an attempt to reduce the phase difference between the current and the reference voltage, the corresponding reference voltage vector 208 simply swings upward along the reference voltage vector locus 214 due to the high grid inductance. As a result, as shown in FIG. 3, such a change in the phase angle of the current causes both a voltage drop in the local reference voltage for the system (as indicated by range 220) and a reduction in the component of the current, I, that is in phase with the grid voltage (as indicated by range 222). Thus, in such instances, if the controller 174 continues to attempt to reduce the phase difference between the current and the local reference voltage, the voltages will continue to collapse, thereby reducing the total power output to the grid.

As will be described in greater detail below, in instances such as those described above with reference to FIG. 3, the power factor operating requirement associated with the wind turbine system 100 may be disregarded to allow the system 100 to be operated in a manner that provides for increased real power to be delivered to grid. Specifically, when certain triggers or identifiers are detected (e.g., decreasing local reference voltages in response to a transient event causing increased generator speeds), the disclosed system and method may be configured to reduce the power factor to a level below the power factor limit or threshold associated with the power factor operating requirement in order to allow for an increase in both the local reference voltage for the system 100 and the power output to the grid. For instance, as shown in FIG. 3, when the voltage drop is detected upon shifting the phase angle of the current, I, from the first current vector 202 to the second current vector 206, the operation of the power converter 162 may be adjusted in a manner that actually reduces the power factor of the system 100, such as shifting the phase angle of the current, I, in the direction of a third current vector 230 in an attempt to increase the phase difference between the current and the local reference voltage. As shown in FIG. 3, such an adjustment of the phase angle of the current, I, from the second current vector 206 to the third current vector 230 may result in an increase in both the local reference voltage (indicated by range 232) and the component of the current, I, that is in phase with the grid voltage (indicated by range 234).

It should be appreciated that, in several embodiments, in the absence of the specific triggers identified herein, the wind turbine system 100 may be operated normally, such as by operating the system 100 in a manner consistent with its power factor operating requirements.

Referring now to FIG. 4, one embodiment of a method 300 for controlling a power generation system connected to a weak grid is illustrated in accordance with aspects of the present subject matter. In general, the method 300 will be described herein as being implemented using a wind turbine system, such as the wind turbine system 100 described above with reference to FIG. 2. However, it should be appreciated that the disclosed method 300 may be implemented using any other suitable power generation system that is configured to supply power for application to a load. In addition, although FIG. 4 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown in FIG. 4, at (302), the method 300 includes operating a power converter of the power generation system at or above a power factor threshold while the system is connected to a weak grid. For example, as indicated above, a wind turbine system 100 is often required to produce current at an output power factor at or above a given power factor threshold associated with its power factor operating requirements. For instance, the power factor threshold typically corresponds to a power factor at or near unity power factor, such as a power factor ranging from 0.9 to 1.0.

Additionally, at (304), the method 300 includes detecting that a generator speed of the power generation system has increased over a period of time. Specifically, as indicated above, various transient events, such as wind gusts and other events, can result in an increase in the speed of the generator 120 when the system 100 is operating at nominal power. Thus, in several embodiments, the controller 174 may be coupled to a suitable sensor(s) for monitoring the generator speed, such as the sensor(s) 190 described above with reference to FIG. 2.

Moreover, at (306), the method 300 includes detecting that a local reference voltage for the power generation system has decreased within the same period of time over which the generator speed has increased. Specifically, as indicated above, when a wind turbine system 100 is connected to a weak grid during a transient event that results in an increase in the generator speed, attempts to maintain the current at a power factor at or above the required power factor threshold may actually result in a decrease in the local reference voltage of the system 100. Thus, in several embodiments, the controller 174 may be communicatively coupled to suitable sensors (e.g., the voltage transducers 144 of FIG. 2) in order to monitor the local reference voltage, thereby providing a means for detecting when the reference voltage is falling as a result of the system's power factor operating requirement.

Further, at (308), the method 300 includes adjusting the operation the power converter to produce current at a reduced power factor below the power factor threshold so as to increase the real power output of the system. Specifically, as indicated above with reference to FIG. 3, when the system 100 is connected to a weak grid, attempts to produce current at or above a power factor threshold that is at or near unity power factor may result in the voltage collapses, thereby causing an overall reduction in the power output to the grid. Accordingly, in several embodiments, the required power factor threshold may be disregarded to allow the operation of the power converter 162 to be adjusted in a manner that provides for an increase in the overall power output of the system 100.

In several embodiments, the reference voltage measurements provided by the relevant sensors (e.g., the voltage transducers 142 of FIG. 2) may be used as a trigger for adjusting the operation of the converter 162 in manner that produces current at a power factor below the required power factor threshold. For example, in one embodiment, the local reference voltage may be monitored to determine when it falls below a predetermined voltage threshold. In such an embodiment, when the local reference voltage drops below the voltage threshold at the same time that the generator speed is increasing in response to a transient event, it may be assumed that the reference voltage is falling as a result of the controller 174 attempting to produce current in accordance with the system's power factor operating requirements (e.g., as shown in the example of FIG. 3 by adjusting the current from the first current vector 202 to the second current vector 206). Accordingly, the operation of the power converter 162 may be adjusted in order to reduce the associated power factor below the power factor threshold to allow the local reference voltage, as well as the power output to the grid, to be increased.

It should be appreciated that the voltage threshold may generally correspond to any suitable predetermined voltage. However, in several embodiments, the voltage threshold may be selected based on any relevant local grid requirements, such as by setting the voltage threshold as the voltage under which the wind turbine is expected to be taken off-line based on the grid requirements. For instance, in a particular embodiment, the voltage threshold may correspond to a voltage amount ranging from about 0.9 to about 1.0 times the nominal turbine voltage.

It should also be appreciated that, as an alternative to identifying when the local reference voltage falls below a given threshold, the reference voltage may simply be monitored in order to detect when the voltage is dropping, thereby providing a trigger for adjusting the operation of the power converter 162. For instance, when the reference voltage measurements indicate that the local reference voltage has steadily decreased over a given period of time (e.g., when the reference voltage drops over multiple consecutive measurements) while the generator speed has increased, it may be necessary to disregard the system's required power factor threshold and, instead, adjust the operation of the power converter 162 in a manner that provides for increased power output.

Moreover, in addition to the local reference voltage, any other suitable operating parameters may be used as a basis for indicating that the system's required power factor threshold should be disregarded. For instance, in a particular embodiment, it may be desirable to also monitor the output current of the wind turbine system 100 in relation to a maximum current limit for the system 100. In such an embodiment, when the local reference voltage is decreasing over time and the output current of the system 100 is at its maximum current limit, the controller 174 may be configured to coordinate the actual voltage with the current being produced to determine of the local reference voltage is falling due to the controller 174 attempting to maintain the power factor at or above the required power factor threshold. If it is determined that the local reference voltage is falling due to such the power factor operating requirement, then the operation of the power converter 162 may be adjusted in a manner that reduces the power factor so as to provide for an increase in the local reference voltage.

It should be appreciated that, in general, any suitable adjustment(s) may be made to the operation of the power converter 162 that allows for the power factor to be reduced in a manner that results in an increase of the real power output of the system 100. For example, in several embodiments, the power factor may be reduced by decreasing the real output current of the system 100 and/or by increasing the reactive output current of the system 100. In doing so, the real and/or reactive currents may be adjusted in a manner that maintains the same output current magnitude for the wind turbine system 100 or that results in a change in the output current magnitude for the system 100.

For example, in several embodiments, the controller 174 may be configured to calculate real and reactive current limits that dynamically change based on the current operating conditions of the system 100. Specifically, in a particular embodiment, the real current limit may be decreased and the reactive current limit may be increased as the local reference voltage drops. As a result, the reactive power output from the system 100 may be increased when the active power output is limited due to the reduced voltage. As described above with reference to FIG. 3, such a reduction in the power factor may allow for the local reference voltage to be increased, which may, in turn, result in an increase in the real power delivered to the grid.

In one embodiment, the real and reactive current limits may be dynamically calculated using the following equations (Equations (5)-(8)):

$$I\text{Max}^2 = I_x\text{Max}^2 + I_y\text{Max}^2 \quad (5)$$

$$I_x\text{Max} = I\text{Max} * \cos\theta \quad (6)$$

$$I_x\text{MaxDyn} = I_x\text{Max} * PCR \quad (7)$$

$$I_y\text{MaxDyn} = \sqrt{I\text{Max}^2 - I_x\text{MaxDyn}^2} \quad (8)$$

wherein, IMax corresponds to a maximum current magnitude for the power converter 162, $I_x$Max corresponds to a nominal maximum real current for the power converter 162 for operation at the power factor threshold, $I_y$Max corresponds to a nominal maximum reactive current for the power converter 162 for operation at the power factor threshold, θ corresponds to the power factor angle associated with the power factor threshold, $I_x$MaxDyn corresponds to the dynamic real current limit for operating the power converter 162 at power factors below the power factor threshold, PCR corresponds to a power curtailment ratio and $I_y$MaxDyn corresponds to the dynamic reactive current limit for operating the power converter 162 at power factors below the power factor threshold.

It should be appreciated that, in several embodiments, the power curtailment ratio, PCR, may generally correspond to a value ranging from zero to one based on the per unit value of the local reference voltage. Specifically, in one embodiment, the power curtailment ratio may be equal to one when the per unit value of the local reference voltage is within a nominal operating range, such as a per unit value ranging from 0.9 to 1.0. However, as the per unit value of the local reference voltage drops below the nominal operating range, the power curtailment ratio may be decreased from one towards the zero. For instance, in a particular embodiment, the power curtailment ratio may be decreased linearly from a value of one at the lower limit of the nominal operating range (e.g., a per unit value of 0.9) to a value of zero at a lower per unit value, such as a per unit value of 0.5. Regardless, by reducing the power curtailment ratio based on reductions in the local reference voltage, the dynamic real current limit may be decreased as the local reference voltage decreases (e.g., per Equation (7)), thereby increasing the dynamic reactive current limit (e.g., per Equation (8)). As such, the reactive power output of the system 100 may be increased in a manner that pushes up the local reference voltage, thereby allowing for an increase in the real power output to the grid.

A graph showing the nominal maximum real and reactive currents as well as examples of dynamic real and reactive current limits calculated using Equations (5)-(8) are illustrated in FIG. 5. As shown, the graph charts the real current, $I_x$, on the x-axis and the reactive current, $I_y$, on the y-axis. In addition, a circle 400 on the graph generally defines the outer limit for the current magnitude, with the maximum current magnitude for the power converter 162 being represented by a current magnitude vector, IMax, extending outwardly from the origin to the outer circle 400. As shown in FIG. 5, when the power converter 162 is being operated according to the power factor operating restriction placed on the system 100, a first current magnitude vector 402 may be defined extending relative to the x-axis at a given power factor angle, θ, associated with the power factor threshold, with the x-axis component of the first current magnitude vector 402 generally corresponding to the maximum real current 404, $I_x$Max, when the power converter 162 is producing current at the power factor threshold and the y-axis component of the first current magnitude vector 402 generally corresponding to the maximum reactive current 406, $I_y$Max, when the power converter 162 is producing current at the power factor threshold.

In addition, FIG. 5 illustrates a second current magnitude vector 408 generally corresponding to one example of real and reactive current limits associated with a power factor that is less than the power factor threshold, with the x-axis component of the second current magnitude vector 408 generally corresponding to the calculated dynamic real current limit 410, $I_x$MaxDyn, associated with the reduced power factor and the y-axis component of the second current magnitude vector 408 generally corresponding to the dynamic reactive current limit 412, $I_y$MaxDYN, associated with the reduced power factor. As shown in FIG. 5, by increasing the power factor angle for the second current magnitude vector 408 to an angle above the power factor angle associated with the power factor threshold (e.g., angle θ in FIG. 5), the reactive current limit 412 for the converter 162 may be increased while the real current limit 410 for the converter 162 may be decreased. As such, the power converter 162 may be operated in a manner that allows the reactive power output of the wind turbine system 100 to be increased so as to provide for an increase in the local reference voltage, thereby allowing for a corresponding increase in the real power output to the grid.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a power generation system connected to a weak grid, the power generation system being subject to a power factor operating requirement, the method comprising:
    operating a power converter of the power generation system connected to the weak grid so as to produce current at or above a power factor threshold associated with the power factor operating requirement;
    detecting that a generator speed of the power generation system has increased over a period of time;
    detecting that a local reference voltage for the power generation system has decreased within the same period of time over which the generator speed has increased; and
    adjusting the operation of the power converter to produce current at a reduced power factor below the power factor threshold so as to increase a real power output of the power generation system.

2. The method of claim 1, wherein detecting that the local reference voltage has decreased comprises detecting when the local reference voltage has decreased below a voltage threshold within the same period of time over which the generator speed has increased.

3. The method of claim 1, further comprising detecting that a current output for the power generation system is at a maximum current output for the power converter.

4. The method of claim 1, wherein adjusting the operation of the power converter to produce current at a reduced power factor below the power factor threshold comprises decreasing a real current output of the power generation system and increasing a reactive current output of the power generation system so as to increase the real power output of the power generation system.

5. The method of claim 4, further comprising dynamically calculating a reactive current limit for the power converter.

6. The method of claim 5, wherein the reactive current limit is dynamically calculated as a function of a power curtailment ratio for the power generation system, the power curtailment ratio being based on a per unit value of the local reference voltage.

7. The method of claim 6, wherein the power curtailment ratio decreases with decreases in the local reference voltage.

8. The method of claim 1, wherein the power factor threshold corresponds to a power factor ranging from 0.9 to 1.0.

9. A system for controlling a power generation system connected to a weak grid, the power generation system being subject to a power factor operating requirement, the system comprising:
    a power converter connected to the weak grid, the power converter being configured to initially produce current at or above a power factor threshold associated with the power factor operating requirement; and
    a controller communicatively coupled to the power converter, the controller being configured to:
        detect that a generator speed of the power generation system has increased over a period of time;
        detect that a local reference voltage for the power generation system has decreased within the same period of time over which the generator speed has increased; and
        adjust the operation of the power converter to produce current at a reduced power factor below the power factor threshold so as to increase a real power output of the power generation system.

10. The system of claim 9, wherein the controller is configured to detect when the local reference voltage has decreased below a voltage threshold within the same period of time over which the generator speed has increased.

11. The system of claim 9, wherein the controller is further configured to detect that a current output for the power generation system is at a maximum current output for the power converter.

12. The system of claim 9, wherein the controller is configured to adjust the operation of the power converter to produce current at the reduced power factor by decreasing a real current output of the power generation system and increasing a reactive current output of the power generation system.

13. The system of claim 12, wherein the controller is further configured to dynamically calculate a reactive current limit for the power converter.

14. The system of claim 13, wherein the reactive current limit is dynamically calculated as a function of a power curtailment ratio for the power generation system, the power curtailment ratio being based on a per unit value of the local reference voltage.

15. The system of claim 14, wherein the power curtailment ratio decreases with decreases in the local reference voltage.

16. The system of claim 9, wherein the power factor threshold corresponds to a power factor ranging from 0.9 to 1.0.

17. The system of claim 9, wherein the power generation system comprises a wind turbine system.

18. A system for controlling a wind turbine system connected to a weak grid, the wind turbine system being subject to a power factor operating requirement, the system comprising:
    a wind-driven generator;
    a power converter connected to the wind-driven generator and the weak grid, the power converter being configured to initially produce current at or above a power factor threshold associated with the power factor operating requirement; and
    a controller communicatively coupled to the power converter, the controller being configured to:
        detect that a speed of the wind-driven generator has increased over a period of time;

detect that a local reference voltage for the wind turbine system has decreased within the same period of time over which the speed of the wind-driven generator has increased; and adjust the operation of the power converter to produce current at a reduced power factor below the power factor threshold so as to increase a real power output of the wind turbine system.

19. The system of claim 18, wherein the power factor threshold corresponds to a power factor ranging from 0.9 to 1.0.

20. The system of claim 18, wherein the wind-driven generator comprises a wind-driven doubly fed induction generator.

\* \* \* \* \*